US005298051A

United States Patent [19]
Claar et al.

[11] Patent Number: 5,298,051
[45] Date of Patent: Mar. 29, 1994

[54] METHOD OF MODIFYING CERAMIC COMPOSITE BODIES BY A POST-TREATMENT PROCESS AND ARTICLES PRODUCED THEREBY

[75] Inventors: Terry D. Claar, Newark; Gerhard H. Schiroky, Hockessin; William B. Johnson, Newark, all of Del.

[73] Assignee: Lanxide Technology Company, LP, Newark, Del.

[21] Appl. No.: 973,449

[22] Filed: Nov. 9, 1992

Related U.S. Application Data

[60] Division of Ser. No. 700,349, May 7, 1991, Pat. No. 5,162,098, which is a continuation of Ser. No. 296,239, Jan. 12, 1989, abandoned, which is a continuation-in-part of Ser. No. 137,382, Dec. 23, 1987, Pat. No. 4,915,736.

[51] Int. Cl.⁵ .................................................. C22C 29/04
[52] U.S. Cl. .......................................... 75/238; 75/243; 75/328; 501/87; 501/93
[58] Field of Search .......................... 75/238, 245, 328; 501/87, 93

[56] References Cited

U.S. PATENT DOCUMENTS

| | | | |
|---|---|---|---|
| 2,746,133 | 5/1956 | Lowe | 29/182.8 |
| 3,178,807 | 4/1965 | Bergmann | 29/182.7 |
| 3,749,571 | 7/1973 | Stibbs et al. | 75/204 |
| 3,758,662 | 9/1973 | Tobin | 264/332 |
| 3,953,177 | 4/1976 | Sedlatschek et al. | 219/182.2 |
| 4,104,062 | 8/1978 | Weaver | 75/238 |
| 4,471,059 | 9/1984 | Yoshino et al. | 501/96 |
| 4,585,618 | 4/1986 | Fresnel et al. | 419/12 |
| 4,595,545 | 6/1986 | Sane | 264/65 |
| 4,605,440 | 8/1986 | Halverson | 75/238 |
| 4,617,053 | 10/1986 | Joo et al. | 75/244 |
| 4,692,418 | 9/1987 | Boecker et al. | 501/90 |
| 4,702,770 | 10/1987 | Pyzik | 75/236 |
| 4,713,360 | 12/1987 | Newkirk et al. | 501/87 |
| 4,718,941 | 1/1988 | Halverson | 75/236 |
| 4,777,014 | 10/1988 | Newkirk et al. | 419/12 |
| 4,834,938 | 5/1989 | Pyzik et al. | 419/14 X |
| 4,885,130 | 1/1989 | Claar et al. | 419/12 |
| 4,885,131 | 1/1989 | Newkirk | 419/12 |
| 4,891,338 | 1/1990 | Gesing et al. | 501/87 |
| 4,904,446 | 2/1990 | White et al. | 419/13 |

FOREIGN PATENT DOCUMENTS

| | | |
|---|---|---|
| 0165707 | 12/1985 | European Pat. Off. |
| 0193292 | 9/1986 | European Pat. Off. |
| 0239520 | 9/1987 | European Pat. Off. |
| 1492477 | 11/1977 | United Kingdom |

*Primary Examiner*—Donald P. Walsh
*Assistant Examiner*—Daniel Jenkins
*Attorney, Agent, or Firm*—Mark G. Mortenson; Stanislav Antolin; Carol A. Lewis

[57] ABSTRACT

This invention relates generally to a novel method of manufacturing a composite body, such as a $ZrB_2$-ZrC-Zr (optional) composite body, by utilizing a post-treatment process and to the novel products made thereby. More particularly, the invention relates to a method of modifying a composite body comprising one or more boron-containing compounds (e.g., a boride or a boride and a carbide) which has been made by the reactive infiltration of a molten parent metal into a bed or mass containing boron carbide, and optionally one or more inert fillers, to form the body.

20 Claims, 2 Drawing Sheets

ZrC

Zr $ZrB_2$ $Zr(C_xN_{1-x})_y$

METHOD OF MODIFYING CERAMIC COMPOSITE BODIES BY A POST-TREATMENT PROCESS AND ARTICLES PRODUCED THEREBY

CROSS-REFERENCE TO RELATED APPLICATION

This is a divisional of copending applications(s) Ser. No. 07/700,349 filed on May 7, 1991 which issued on Nov. 10, 1992, as U.S. Pat. No. 5,162,098, which was a continuation of U.S. Pat. application Ser. No. 07/296,239, filed on Jan. 12, 1989, now abandoned, which was a continuation-in-part of U.S. Patent application Ser. No. 07/137,382, filed on Dec. 23, 1987, which issued on Apr. 10, 1990, as U.S. Pat. No. 4,915,736, in the names of Terry Dennis Claar and Gerhard Hans Schiroky, and entitled "A Method of Modifying Ceramic Composite Bodies by a Carburization Process and Articles Produced Thereby", the subject matter of which is herein incorporated by reference.

FIELD OF THE INVENTION

This invention relates generally to a novel method of manufacturing a composite body, such as a $ZrB_2$-$ZrC$-$Zr$ (optional) composite body, by utilizing a post-treatment process and to the novel products made thereby. More particularly, the invention relates to a method of modifying a composite body comprising one or more boron-containing compounds (e.g., a boride or a boride and a carbide) which has been made by the reactive infiltration of a molten parent metal into a bed or mass containing boron carbide, and optionally one or more inert fillers, to form the body.

BACKGROUND OF THE INVENTION

In recent years, there has been an increasing interest in the use of ceramics for structural applications historically served by metals. The impetus for this interest has been the relative superiority of ceramics, when compared to metals, with respect to certain properties, such as corrosion resistance, hardness, wear resistance, modulus of elasticity and refractory capabilities.

However, a major limitation on the use of ceramics for such purposes is the feasibility and cost of producing the desired ceramic structures. For example, the production of ceramic boride bodies by the methods of hot pressing, reaction sintering, and reaction hot pressing is well known. While there has been some limited success in producing ceramic boride bodies according to the above-discussed methods, there is still a need for a more effective and economical method to prepare dense boride-containing materials.

In addition, a second major limitation on the use of ceramics for structural applications is that ceramics generally exhibit a lack of toughness (i.e., damage tolerance, or resistance to fracture). Such lack of toughness tends to result in sudden, easily induced, catastrophic failure of ceramics in applications involving rather moderate tensile stresses. This lack of toughness tends to be particularly common in monolithic ceramic boride bodies.

One approach to overcome the above-discussed problem has been the attempt to use ceramics in combination with metals, for example, as cermets or metal matrix composites. The objective of this known approach is to obtain a combination of the best properties of the ceramic (e.g., hardness and/or stiffness) and the best properties of the metal (e.g., ductility). While there has been some general success in the cermet area in the production of boride compounds, there still remains a need for more effective and economical methods to prepare boride-containing materials.

DISCUSSION OF RELATED PATENT APPLICATIONS

Many of the above-discussed problems associated with the production of boride-containing materials have been addressed in copending U.S. Patent application Ser. No. 073,533, now abandoned filed in the names of Danny R. White, Michael K. Aghajanian and T. Dennis Claar, on Jul. 15, 1987, and entitled "Process for Preparing Self-Supporting Bodies and Products Made Thereby". The subject matter of application Ser. No. 073,533 (hereinafter referred to as application '533) is herein expressly incorporated by reference.

The following definitions were used in application '533 and shall apply to the instant application as well.

"Parent metal" refers to that metal (e.g., zirconium) which is the precursor for the polycrystalline oxidation reaction product, that is, the parent metal boride or other parent metal boron compound, and includes that metal as a pure or relatively pure metal, a commercially available metal having impurities and/or alloying constituents therein, and an alloy in which that metal precursor is the major constituent; and when a specific metal is mentioned as the parent metal (e.g. zirconium), the metal identified should be read with this definition in mind unless indicated otherwise by the context.

"Parent metal boride" and "parent metal boro compounds" mean a reaction product containing boron formed upon reaction between boron carbide and the parent metal and includes a binary compound of boron with the parent metal as well as ternary or higher order compounds.

"Parent metal carbide" means a reaction product containing carbon formed upon reaction of boron carbide and parent metal.

Briefly summarizing the disclosure of application '533, self-supporting ceramic bodies are produced by utilizing a parent metal infiltration and reaction process (i.e., reactive infiltration) in the presence of a boron carbide. Particularly, a bed or mass of boron carbide is infiltrated by molten parent metal, and the bed may be comprised entirely of boron carbide, thus resulting in a self-supporting body comprising one or more parent metal boron-containing compounds, which compounds include a parent metal boride or a parent metal boro carbide, or both, and typically also may include a parent metal carbide. It is also disclosed that the mass of boron carbide which is to be infiltrated may also contain one or more inert fillers mixed with the boron carbide. Accordingly, by combining an inert filler, the result will be a composite body having a matrix produced by the reactive infiltration of the parent metal, said matrix comprising at least one boron-containing compound, and the matrix may also include a parent metal carbide, the matrix embedding the inert filler. It is further noted that the final composite body product in either of the above-discussed embodiments (i.e., filler or no filler) may include a residual metal as at least one metallic constituent of the original parent metal.

Broadly, in the disclosed method of application '533, a mass comprising boron carbide is placed adjacent to or in contact with a body of molten metal or metal alloy, which is melted in a substantially inert environment within a particular temperature envelope. The molten metal infiltrates the boron carbide mass and reacts with the boron carbide to form at least one reaction product. The boron carbide is reducible, at least in part, by the molten parent metal, thereby forming the parent metal boron-containing compound (e.g., a parent metal boride and/or boro compound under the temperature conditions of the process). Typically, a parent metal carbide is also produced, and in certain cases, a parent metal boro carbide is produced. At least a portion of the reaction product is maintained in contact with the metal, and molten metal is drawn or transported toward the unreacted boron carbide by a wicking or a capillary action. This transported metal forms additional parent metal, boride, carbide, and/or boro carbide and the formation or development of a ceramic body is continued until either the parent metal or boron carbide has been consumed, or until the reaction temperature is altered to be outside of the reaction temperature envelope. The resulting structure comprises one or more of a parent metal boride, a parent metal boro compound, a parent metal carbide, a metal (which, as discussed in application '533, is intended to include alloys and intermetallics), or voids, or any combination thereof. Moreover, these several phases may or may not be interconnected in one or more dimensions throughout the body. The final volume fractions of the boron-containing compounds (i.e., boride and boron compounds), carbon-containing compounds, and metallic phases, and the degree of interconnectivity, can be controlled by changing one or more conditions, such as the initial density of the boron carbide body, the relative amounts of boron carbide and parent metal, alloys of the parent metal, dilution of the boron carbide with a filler, temperature, and time.

The typical environment or atmosphere which was utilized in application '533 was one which is relatively inert or unreactive under the process conditions. Particularly, it was disclosed that an argon gas, or a vacuum, for example, would be suitable process atmospheres. Still further, it was disclosed that when zirconium was used as the parent metal, the resulting composite comprised zirconium diboride, zirconium carbide, and residual zirconium metal. It was also disclosed that when aluminum parent metal was used with the process, the result was an aluminum boro carbide such as $Al_3B_{48}C_2$, $AlB_{12}C_2$ and/or $AlB_{24}C_4$, with aluminum parent metal and other unreacted unoxidized constituents of the parent metal remaining. Other parent metals which were disclosed as being suitable for use with the processing conditions included silicon, titanium, hafnium, lanthanum, iron, calcium, vanadium, niobium, magnesium, and beryllium.

Thus, application '533 discloses a novel process, and novel bodies resulting from the process, which overcomes many of the deficiencies of the prior art discussed above, thus satisfying a long-felt need.

SUMMARY OF THE INVENTION

The present invention has been developed in view of the foregoing and is an improvement over the prior art.

The invention provides a method for modifying of the resultant amount of parent metal present in a composite body. Particularly, in a first preferred embodiment, the amount of parent metal can be modified or controlled by exposing the composite body (i.e., the residual parent metal in the composite body) to a carburizing environment (e.g., either a gaseous carburizing species or a solid carbon material) which modifies the composition of the residual parent metal, thus modifying the properties of the residual parent metal. Moreover, the properties of the resultant composite body can also be modified. Parent metals such as zirconium, titanium, and hafnium are well suited to be treated by the carburizing processes according to the present invention.

In a second preferred embodiment, the amount of parent metal can be modified or controlled by exposing the composite body (i.e., the residual parent metal in the composite body) to a boriding environment (e.g., by heating a composite body containing unreacted parent metal in a substantially inert atmosphere while contacting (e.g., being embedded in) a mass comprising a boron source). The metal remaining in the composite reacts with the boron source to form a parent metal boride, thus modifying the properties of the resultant composite. The metal content of the composite can be controlled to provide a composite comprising about 0 to about 2 volume percent parent metal. Parent metals such as zirconium, titanium, and hafnium are well suited to be treated by the boriding processes according to the present invention.

In a third preferred embodiment, the amount of parent metal can be modified or controlled by exposing the composite body (i.e., the residual parent metal in the composite body) to a nitriding environment (e.g., by heating a composite body containing unreacted parent metal in a substantially inert atmosphere while contacting (e.g., being embedded in) a mass comprising a nitrogen source). The metal remaining in the composite reacts with the nitride source to form a parent metal nitride, thus modifying the properties of the resultant composite. The metal content of the composite can be controlled to provide a composite comprising about 0 to about 2 volume percent parent metal. Parent metals such as zirconium, titanium, and hafnium are well suited to be treated by the nitriding processes according to the present invention. This application refers primarily to $ZrB_2$-$ZrC$-$Zr$ composite bodies, hereinafter referred to as "ZBC" composite bodies. However, it should be understood that while specific emphasis has been placed upon ZBC composite bodies, similar manufacturing steps are applicable to titanium and hafnium parent metal composite bodies as well.

Broadly, in a first preferred embodiment, after forming a ZBC composite according to the process disclosed in application '533, the ZBC composite is embedded in a graphitic or carbon donor material bedding, which is contained in an appropriate refractory vessel. The filled refractory vessel is heated in, for example, an electric resistance furnace containing an argon atmosphere. During heating, it is believed that small amounts of $H_2O$ or $O_2$ become available for reaction. These small amounts of $H_2O$ or $O_2$ are either intrinsically present in the argon gas or are liberated from the graphite bedding material or the ZBC composite. Thus, upon heating, carbon in the graphitic bedding material can react with oxygen to form a gaseous carburizing species. It also is possible to provide a direct source of a carburizing species, such as, for example, a $CO/CO_2$ mixture or a $H_2/CH_4$ mixture. It is theorized that carbon from the carburizing species dissolves into the $ZrC_{1-x}$ phase in the ZBC composite and the carbon can then be transported throughout the ZBC composite by a vacancy diffusion mechanism. Thus, carbon can be transported so as to contact the residual parent metal to form additional amounts of a parent metal-carbide phase (e.g., if zirconium is the parent metal, the phase $ZrC_{1-x}$ results due to the carburizing treatment). However, some carbon from the graphite bedding material may also be directly diffused into the $ZrC_{1-x}$ phase.

Likewise, in a second preferred embodiment, after forming a ZBC composite according to the process disclosed in application '533, the ZBC composite is embedded in a bedding comprising $B_4C$ which is contained, for example, in a graphite crucible. The crucible is heated in a suitable vacuum furnace which is evacuated and backfilled with an inert gas, preferably argon. The furnace is heated and maintained at a temperature sufficient to permit a reaction between any unreacted zirconium in the ZBC composite and the $B_4C$ bedding. During heating, it is believed that the $B_4C$ reacts with zirconium to form additional $ZrB_2$. Due to the boride formation or boriding, the mechanical properties of the composite can be modified. For example, as the volume percent of residual or unreacted zirconium parent metal decreases, the fracture toughness decreases. A similar relationship has been discovered in reference to 4-point bending strengths of ZBC composites that have been borided. However, due to the conversion of residual parent metal, the high temperature strength of the composite body increases. Accordingly, by subjecting a ZBC composite to a boriding process, the mechanical properties of the composite can be tailored to provide a wide range of desired properties in the final product.

In a third preferred embodiment, after forming a ZBC composite according to the process disclosed in application '533, the ZBC composite may be nitrided. Specifically, a $ZrC$-$ZrB_2$-$ZrN$ composite may be formed. A ZBC composite may be embedded in a nitrogen donor material, for example, ZrN, which may be contained in a refractory vessel. The refractory vessel, such as $Al_2O_3$, is heated, for example, in an electric resistance heated vacuum furnace. During heating, it may be desirable for nitrogen gas to pass through the furnace. It is believed that the formation of ZrN is a diffusion controlled process wherein a source of nitrogen diffuses in the bulk of the ZBC to react with any residual zirconium in the ZBC composite. As zirconium nitride is formed, it is believed the carbide phase dissolves into the nitride to form $Zr(C_xN_{1-x})_y$. Accordingly, by subjecting a ZBC composite to a nitriding process, the mechanical properties of the composite can be tailored to provide a wide range of desired properties in the final product.

Such post-treatment processing is advantageous because it permits conversion of a residual parent metal phase into, for example, a harder and more refractory phase. Specifically, in applications which require high temperature strength, a ZBC composite begins to lose strength at a temperature at or above the melting point of the residual parent metal phase. By post-treating the ZBC composite by a carburization process, a boriding process and/or a nitriding process, the parent metal phase is converted into a carbide, a boride and/or a nitride; of the parent metal (e.g., Zr parent metal is converted to $ZRC_m$ $ZrB_2$ and/or ZrN, respectively). The amount of parent metal which typically remains in a ZBC composite produced according to the method in application '533 is about 5-40 volume percent. Upon exposing the ZBC composite to a posttreatment process, the amount of residual zirconium parent metal remaining can be reduced to, for example, about 0 to about 2 volume percent.

The modified ZBC composite is useful for aerospace components such as nozzle inserts because the low metal content permits the ZBC composite to be used in even higher temperature applications than previously thought possible, without significantly compromising the fracture toughness and thermal shock resistance of the ZBC composite body. Thus, the posttreatment process of the present invention is particularly applicable for applications which require a resistance to high temperature erosion, have good thermal shock properties, and have a relatively high elevated temperature strength at a temperature of, for example, 2200°-2700° C.

Moreover, because each post-treatment process is time-dependent, a post-treatment zone or surface (e.g., a carburized, borided or nitrided zone or region) can be created on a ZBC composite body. Thus, an exterior surface of the ZBC composite body can be made to be wear-resistant, while the ZBC composite core retains a high metal content having a corresponding high fracture toughness. Such a ZBC composite body would be particularly applicable in the manufacture of wear plates, wear rings, and impeller inserts for various corrosive and erosive industrial pump applications. Specifically, zirconium metal has a very high corrosion resistance to strong acids, but the metal, by itself, has poor wear characteristics. Thus, by modifying a ZBC composite body, a wear-resistant ceramic outer surface can be formulated with a corrosion-resistive composite interior. Moreover, if substantially all of the zirconium metal is transformed to a ceramic phase (e.g., a $ZrC_{1-x}$ phase), and the post-treatment process is continued, it is possible to increase, for example, the carbon content in the $ZrC_{1-x}$ phase (e.g., from about $ZrC_{0.58}$ to about $ZrC_{0.96}$). If such conversion is induced to occur, then the hardness and refractory properties of the ZBC composite can be expected to increase. Substantially parallel analysis can be made to each of the boriding and nitriding posttreatment processes.

Thus, the present method, and the novel composite body produced therefrom, even further expand the potential applications for ZBC composite bodies.

BRIEF DESCRIPTION OF THE DRAWING(s)

FIG. 1 is a schematic elevational view in cross-section showing a ZBC composite body 3 embedded in a graphitic powder bedding 2 and contained within a refractory vessel 1, to be processed according to the present invention.

DETAILED DESCRIPTION OF THE PREFERRED EMBODIMENTS

Figure 1:
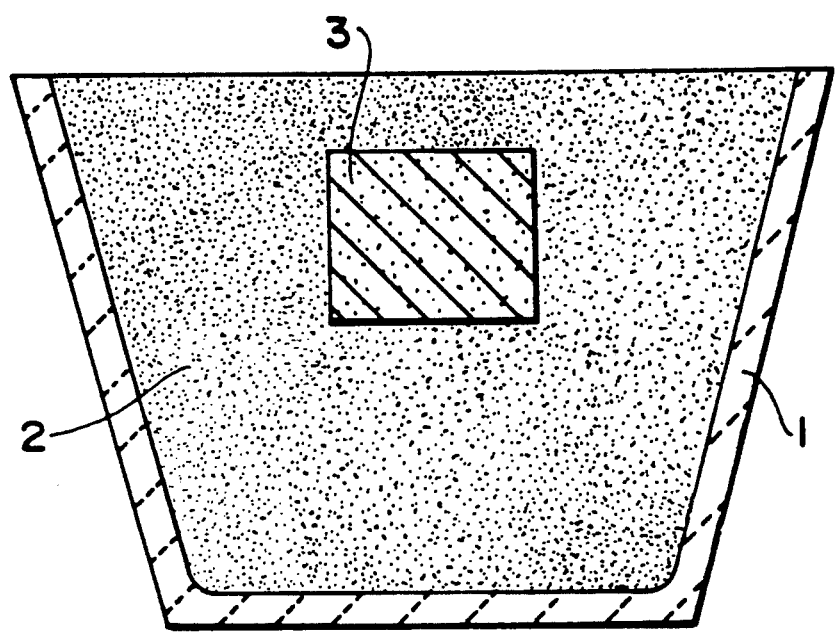

The present invention is based on the discovery that the properties of a ceramic composite body, particularly a ceramic composite body which is manufactured by reactive infiltration of a parent metal of zirconium, hafnium or titanium into a boron carbide mass, can be modified by a postmanufacturing treatment. Such postmanufacturing treatments comprise a carburization process, a boriding process, and/or a nitriding process. Each of the above-mentioned post-manufacturing treatments can alter the microstructure, and thus the resultant mechanical properties, of a portion or substantially all of a ZBC composite body.

In a first preferred embodiment, a ZBC composite body, produced according to application '533 (discussed above herein), can be modified by exposing the composite to a gaseous carburizing species. Such a gaseous carburizing species can be produced by, for example, embedding the ZBC composite body in a graphitic bedding and reacting at least a portion of the graphitic bedding with moisture or oxygen in a controlled atmosphere furnace. However, the furnace atmosphere should comprise typically, primarily, a non-reactive gas such as argon. The use of argon gas from Matheson Gas Products, Inc., produces desirable results. It is not clear whether impurities present in the argon gas supply the necessary $O_2$ for forming a carburizing species, or whether the argon gas merely serves as a vehicle which contains impurities generated by some type of volatilization of components in the graphitic bedding or in the ZBC composite body. In addition, a gaseous carburizing species could be introduced directly into a controlled atmosphere furnace during heating of the ZBC composite body.

Once the gaseous carburizing species has been introduced into the controlled atmosphere furnace, the lay-up should be designed in such a manner to permit the carburizing species to be able to contact at least a portion of the surface of the ZBC composite body buried in the loosely packed graphitic powder. It is believed that carbon in the carburizing species, or carbon from the graphitic bedding, will dissolve into the interconnected zirconium carbide phase, which can then transport the dissolved carbon throughout substantially all of the ZBC composite body, if desired, by a vacancy diffusion process. The diffusion of carbon into the residual zirconium parent metal is quite low. Thus, absent the zirconium carbide phase, it would not be practical, or economical, to attempt to dissolve carbon throughout all of the residual zirconium metal in the ZBC composite body, because the process would take an inordinate amount of time. In this regard, the diffusion of carbon in the zirconium carbide phase and in the zirconium metal phase are both time dependent. However, the rate of transport of carbon in the zirconium carbide phase is much faster than the transport rate of carbon in the zirconium metal phase. Once a desirable amount of carbon has been diffused into the ZBC composite body and contacts residual zirconium parent metal, the zirconium parent metal is converted into ZrC. Such conversion is desirable because the modified ZBC composite will have an increased hardness and an increased elastic modulus, at the limited expense of both flexural strength and toughness. Moreover, the elevated temperature properties will also improve because of a lower metal content in the ZBC composite. It has been discovered that ZBC composites having a residual parent metal in an amount between 5 to 30 volume percent can be modified by a postcarburization treatment to result in about 0 to about 2 volume percent, typically about ½ to about 2 volume percent, of parent metal remaining in the ZBC composite body. Thus, substantially all of the parent metal, however, typically about 4½ to 28 volume percent of the parent metal, can be transformed from zirconium into ZrC.

Moreover, by controlling the time of exposure of the ZBC composite body to any one of the post-manufacturing treatment discussed, namely, the carburizing, boriding, and/or nitriding, and controlling the temperature at which these treatments occur, a modified zone or layer can be formed on at least one exterior surface of a ZBC composite body. Such post-treatment processes can result in a hard, wear-resistant surface surrounding a core of ZBC composite material having a higher metal content and higher fracture toughness.

In summary, it has been found that by subjecting a ZBC composite containing, typically between about 5-30 volume percent of residual zirconium parent metal, to a carburizing, a boriding, and/or a nitriding, species in a controlled atmosphere furnace operating at a temperature of about 1500°-2200° C., for a period of time of about 5-48 hours, a modified ZBC composite will be formed resulting in a more desirable composite body.

The following are examples of the present invention. The examples are intended to be illustrative of various aspects of a post-manufacturing treatment of a composite body, particularly a ZBC composite body. However, these examples should not be construed as limiting the scope of the invention.

EXAMPLE 1

A ZBC composite body formed according to Example 1 disclosed in application '533 was produced. Table 1 shows various mechanical properties of the formed ZBC composite body. All surfaces of the ZBC is composite body were degreased ultrasonically by using acetone and ethanol. The ZBC composite was then buried in a high purity graphite powder bedding having an average particle diameter of about 75 microns. The graphite powder was purchased from Lonza, Inc., and was identified as KS-75. The graphite powder bedding was contained within a graphite mold (Grade ATJ from Union Carbide). The mold was covered on a top surface thereof with a graphite cover plate. The complete assembly of the buried ZBC composite body was then placed into a closed atmosphere resistance heating furnace. The atmosphere in the furnace was argon from Matheson Gas Products, Inc. The furnace was first evacuated at room temperature to a pressure of $1 \times 10^{-4}$ Torr and thereafter backfilled with argon. The furnace was then evacuated to a pressure of about $1 \times 10^{-2}$ Torr and thereafter heated to a temperature of about 500° C. under vacuum. The furnace was again backfilled with argon which then remained flowing at a rate of about one liter per minute and was maintained at a pressure of about 2 psi. The furnace was heated to a temperature of about 1750° C. over a 6-hour period and then held at 1750° C. for about 12 hours. The furnace was then cooled for about 6 hours. After cooling, the carburized ZBC composite was removed from the furnace and any excess graphite powder was removed by grit blasting.

Table 1 shows the mechanical properties of the ZBC composite after the carburization treatment had been effected. It is evident that the amount of residual zirconium parent metal was reduced from about 10% to about ½%, by volume; the hardness, elastic modulus, and shear modulus all increased. However, the increase occurred at the limited expense of flexural strength. It is noted that a flexural strength of about 500 MPa is adequate for many aerospace applications.

TABLE 1

|  | Before Carburization | After Carburization |
|---|---|---|
| Zr Content, vol % | 9.9 | 0.5 |
|  | 80.6 HRA | 81.9 HRA |
| Hardness | 1011 HK | 1388 HK |

TABLE 1-continued

| | Before Carburization | After Carburization |
|---|---|---|
| Elastic Modulus, GPa | 364 | 442 |
| Shear Modulus, GPa | 158 | 184 |
| Flexural Strength MPa (4-point) | 875 | 497 |

While the present invention has been disclosed in its preferred embodiments, it is to be understood that the invention is not limited to the precise disclosure contained herein, but may otherwise be embodied in various changes, modifications, and improvements which may occur to those skilled in the art, without departing from the scope of the invention as defined in the appended claims.

EXAMPLE 2

A preform comprising $B_4C$ was formed by mixing about 477 grams of 1000 grit $B_4C$ and about 9.5 grams of Dow XUS 40303 binder and about 715 grams of methylene chloride which was sediment cast into a 7 inch diameter ATJ graphite mold. Before sediment casting, the graphite mold was sanded with a relatively coarse grit sandpaper. The preform was placed into a furnace in order to burnout or remove the binder. The furnace was then evacuated and backfilled with argon. During the subsequent heating step, argon was passed through the furnace at a rate of approximately 2 liters per minute. The furnace was heated from room temperature up to about 200° C. in about four hours. This temperature was maintained for approximately two hours. The furnace was heated from about 200° C. to about 350° C. at a rate of approximately 20° C. per hour. The temperature was increased from about 350° C. to about 450° C. in about two hours. The furnace was permitted to cool to room temperature in approximately eight hours. The preform weighed about 466 grams and measured about seven inches in diameter and about 0.6 inches in thickness.

A nuclear grade zirconium sponge weighing about 2333.25 grams supplied by Western Zirconium was cleaned and air dried at about 45° C. for one hour and at 70° C. for at least two hours. The zirconium sponge was placed directly on top of the $B_4C$ preform inside the graphite mold. The graphite mold was placed on top of a 10×10×4 inch inverted AGSX boat into an electric resistance vacuum chamber furnace. The furnace was evacuated and backfilled with argon. A vacuum was drawn on the furnace and the furnace was brought to a temperature of about 1000° C. After 1000° C. was reached, argon at 2 liters/min was passed through the furnace having a chamber pressure of about 2 psi. Heating was continued until a temperature of about 1900° C. was reached. The total time to reach 1900° C. was about 8.5 hours. This temperature was maintained for approximately one hour. The furnace was permitted to cool to room temperature in about 12 hours. The graphite crucible was removed from the furnace and inspected. It was discovered that the zirconium sponge had reactively infiltrated the $B_4C$ to form a platelet reinforced composite comprising zirconium diboride and zirconium carbide.

The platelet reinforced composite weighed approximately 2670 grams. The composite was lightly sand blasted in order to remove unreacted $B_4C$. After the sand blasting treatment, the composite weighed approximately 2570 grams and measured approximately 7 inches in diameter and about one inch in thickness. The formed composite then was subjected to a boriding treatment.

Specifically, the above described platelet reinforced composite was embedded in 1000 grit $B_4C$ in a graphite crucible having an inner diameter of approximately 8 inches. The amount of $B_4C$ utilized weighed approximately 521 grams and was obtained from ESK. The graphite crucible containing the platelet reinforced composite and the $B_4C$ bedding material was placed into a vacuum furnace. The furnace was evacuated and backfilled with argon. The furnace was heated at a rate of approximately 300° C. per hour. When a temperature of about 1000° C. was reached, argon was passed through the furnace at a rate of approximately 2 liters per minute. The chamber pressure was about 2 psi. The furnace was continually heated until a temperature of about 1900° C. was obtained. This temperature was maintained for about 30 hours. The furnace was permitted to cool to room temperature at a rate of approximately 200° C. per hour. The graphite crucible was removed and inspected. It was discovered that the $B_4C$ bedding had reacted with residual zirconium metal in the ZBC platelet reinforced composite. The borided composite had a reduced metal content on the order of about 0-2 volume percent.

Figure 2:
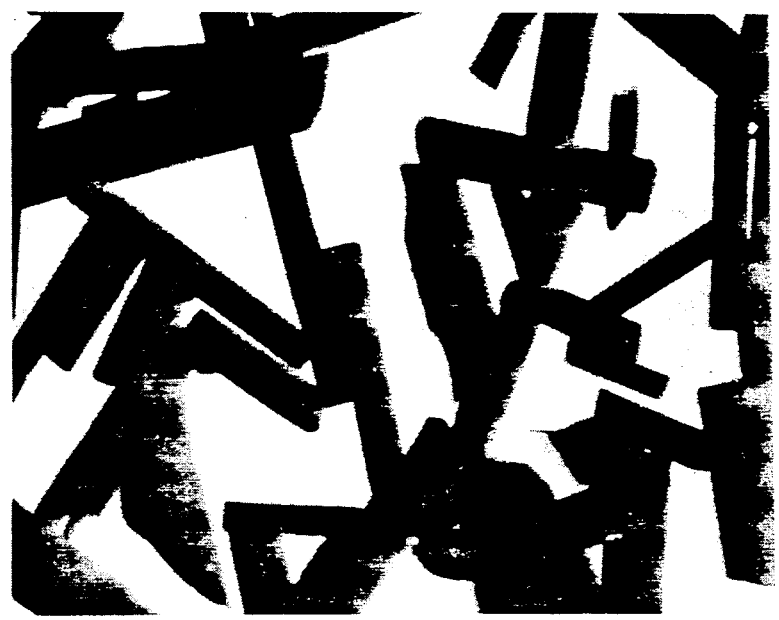
FIG. 2 is a photomicrograph at 1000x of a section of the composite produced according to Example 2.

FIG. 2 is a photomicrograph at 1000X of a section of the modified ZBC composite produced according to the method of Example 2. The darker regions are platelets of $ZrB_2$. The gray region comprise ZrC.

EXAMPLE 3

A ZBC body was formed substantially according to the procedures set forth in Example 1 in application '533. All surfaces of the ZBC composite were degreased and ultrasonically cleaned by utilizing acetone and ethanol. The ZBC body weighed approximately 3.6 grams and was embedded in 1.0-5.0 micron ZrN powder which was contained in an $Al_2O_3$ refractory boat. The $Al_2O_3$ boat containing the ZrN powder and the ZBC body was placed into an electric resistance tube furnace. The furnace was evacuated and backfilled with dried nitrogen gas. During subsequent heating steps, nitrogen was passed through the furnace at a rate of approximately 300 CC per minute. The furnace was heated at a rate of approximately 200° C. per hour until a temperature of about 1600° C. was reached. This temperature was maintained for about 12 hours. The furnace was cooled at a rate of approximately 200° C. per hour. The alumina crucible was removed from the furnace and inspected. It was discovered that a nitrogen species had reacted with the ZBC body to form a ZrN phase.

Figure 3:
FIG. 3 is a photomicrograph at 1000x of a section of the composite produced according to Example 3.

FIG. 3 is a photomicrograph at 1000X of a section of the modified ZBC composite produced according to the method of Example 3. The darkest areas correspond to platelets of $ZrB_2$. The dark region in the upper left hand side, which is defined by $ZrB_2$ platelets, comprises $ZrC_2$. The lighter region on the lower left-hand side comprises $Zr(C_xN_{1-x})_y$. The lightest region comprise Zr metal.

We claim:

1. A self-supporting body comprising at least one metal phase selected from the group consisting of zirconium, titanium, and hafnium; at least one three-dimensionally interconnected ceramic phase extending to boundaries of said self-supporting body, said ceramic phase comprising at least one carbide selected from the group consisting of a carbide of zirconium, a carbide of titanium, and a carbide of hafnium; and at least boride of a metal corresponding to said carbide, said boride having a platelet-like structure, and said self-supporting body further comprising at least one core comprising said at least one metal phase; and at least one modified zone or layer on at least one exterior surface of said at least one core, wherein said at least one metal phase of said at least one core comprises about 4.5–40 percent by volume and said at least one metal phase of said at least one modified zone or layer comprises about 0–2 percent by volume.

2. The self-supporting body according to claim 1, wherein said self-supporting body comprises a pump component.

3. The self-supporting body according to claim 1, wherein said self-supporting body comprises a nozzle insert.

4. The self-supporting body according to claim 1, wherein said at least one metal phase of said at least one modified zone or layer is present in an amount of about 0.5–2 percent by volume.

5. The self-supporting body according to claim 1, wherein said at least one metal phase present in an amount of about 0–2 percent by volume is present substantially completely throughout said composite material.

6. The self-supporting body according to claim 4, wherein said self-supporting body comprises a wear plate.

7. The self-supporting body according to claim 4, wherein said self-supporting body comprises a wear ring.

8. The self-supporting body according to claim 4, wherein said self-supporting body comprises an impeller insert.

9. A self-supporting body comprising: (1) at least one core comprising (a) at least one metal phase selected from the group consisting of zirconium, titanium and hafnium present in an amount of about 4.5–40 percent by volume in at least a portion of said core, (b) a three-dimensionally interconnected ceramic phase extending to the boundaries of said at least one core, said ceramic phase comprising at least one carbide selected from the group consisting of a carbide of zirconium, a carbide of titanium, and a carbide of hafnium and (c) at least one boride of a metal corresponding to a metal of said carbide, said boride having a platelet-like structure; and (2) at least one modified zone or layer on at least a portion of at least one exterior surface of said self-supporting body comprising (a) at least one metal phase selected from the group consisting of zirconium, titanium and hafnium and present in an amount of about 0–2 percent by volume in at least a portion of said at least one modified zone or layer, (b) a three-dimensionally interconnected ceramic phase extending to the boundaries of said at least one modified zone or layer, said ceramic phase comprising at least one carbide selected from the group consisting of a carbide of zirconium, a carbide of titanium and a carbide of hafnium, and (c) at least one boride of a metal corresponding to said carbide, said boride having a platelet-like structure, wherein said at least one metal phase of said core and said at least one metal phase of said at least one modified zone or layer correspond and said at least one carbide phase of said at least one core and said at least one carbide phase of said at least one modified zone or layer comprise a three-dimensionally interconnected ceramic phase extending to boundaries of said self-supporting.

10. The self-supporting body of claim 9, wherein said metal phase of said at least one core and said at least one modified zone or layer comprise zirconium, said boride comprises a boride of zirconium and said carbide comprises a carbide of zirconium.

11. The self-supporting body of claim 10, wherein said carbide comprises $ZrC_{1-x}$.

12. The self-supporting body of claim 11, wherein X comprises a number ranging between about 0.04 and about 0.42.

13. The self-supporting body of claim 10, wherein said carbide comprises $Zr(C_xN_{1-x})_y$.

14. The self-supporting body of claim 9, wherein said self-supporting body comprises a pump component.

15. The self-supporting body of claim 9, wherein said self-supporting body comprises a nozzle insert.

16. The self-supporting body of claim 9, wherein said self-supporting body comprises a wear plate.

17. The self-supporting body of claim 9, wherein said self-supporting body comprises a wear ring.

18. The self-supporting body of claim 9, wherein said self-supporting body comprises an impeller insert.

19. The self-supporting body of claim 9, wherein said at least one modified zone or layer comprises a zone or layer substantially completely covering at least one exterior surface of said self-supporting body.

20. The self-supporting body of claim 9, wherein said at least one modified zone or layer substantially completely covers said exterior surface of said self-supporting body.

* * * * *